A. B. CLARK.
STOVE.
APPLICATION FILED NOV. 5, 1920.
1,406,152.
Patented Feb. 7, 1922.
2 SHEETS—SHEET 1.
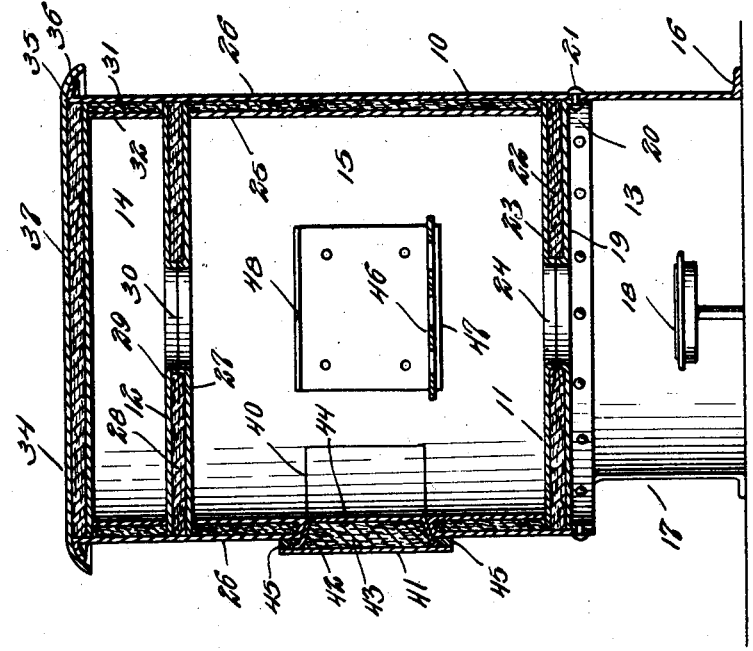
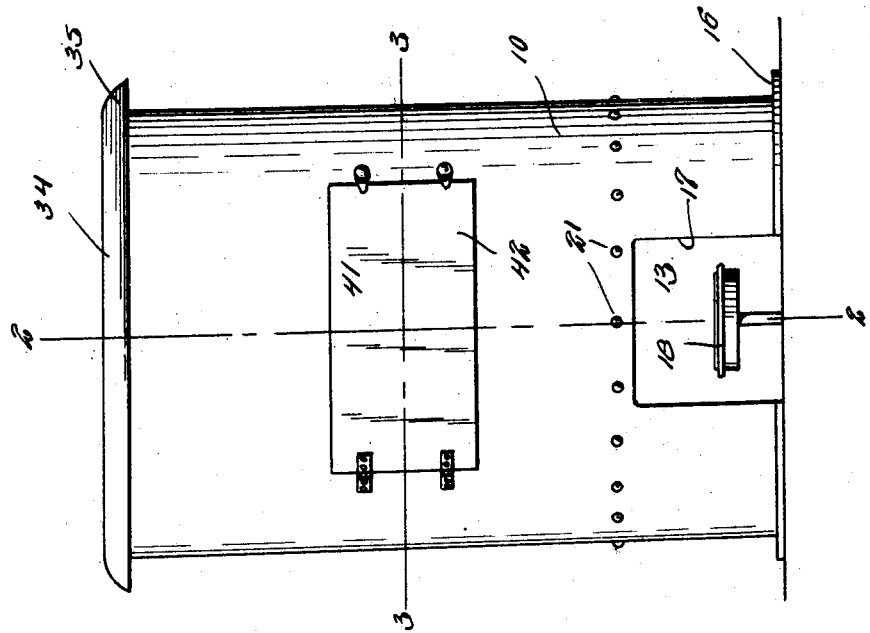
Arthur B. Clark.
INVENTOR
BY Victor J. Evans.
ATTORNEY A. B. CLARK.
STOVE.
APPLICATION FILED NOV. 5, 1920.
1,406,152.
Patented Feb. 7, 1922.
2 SHEETS—SHEET 2.
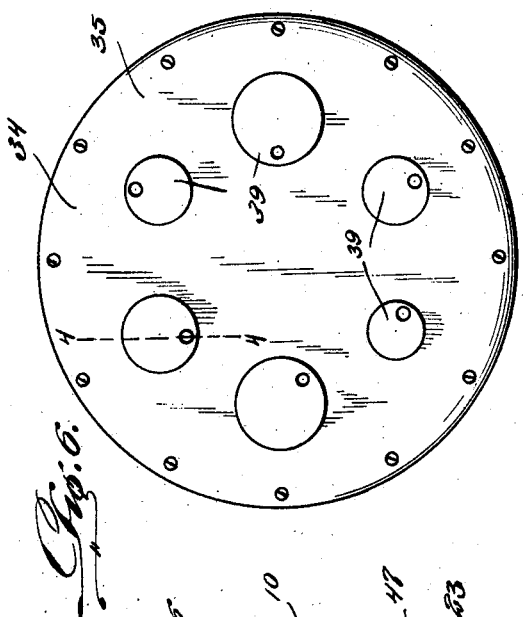
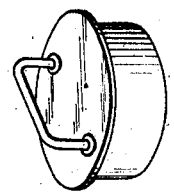
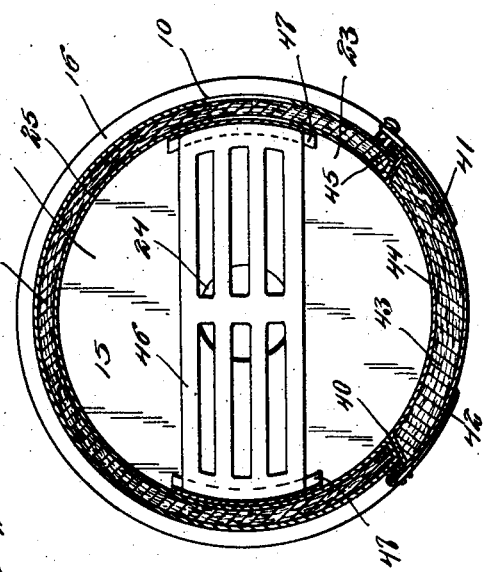
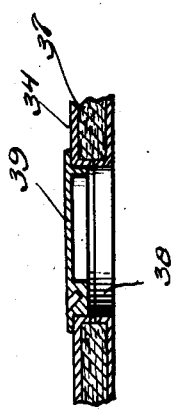
Arthur B. Clark.
INVENTOR
BY Victor J. Evans.
ATTORNEY

UNITED STATES PATENT OFFICE.

ARTHUR B. CLARK, OF DYERVILLE, CALIFORNIA.

STOVE.

1,406,152.     Specification of Letters Patent.     Patented Feb. 7, 1922.

Application filed November 5, 1920. Serial No. 422,016.

*To all whom it may concern:*

Be it known that I, ARTHUR B. CLARK, a citizen of the United States, residing at Dyerville, in the county of Humboldt and State of California, have invented new and useful Improvements in Stoves, of which the following is a specification.

This invention relates to improvements in stoves and has for an object the provision of a stove of novel construction, which may be quickly assembled, due to the interfitting of the various parts, the intermediate parts being held in position by the outer parts, so that a mimimum amount of labor is required in its manufacture and cost of production thus materially reduced.

Another object of the invention is the provision of a stove which may be used either for cooking food in the usual manner or in which the food may be partially cooked and the source of heat cut off and the retained heat utilized to finish the cooking after the manner of a fireless cooker.

Another object is the provision of a stove which may be used either for cooking or heating purposes and when used for the former, heat will be retained in the stove and over heating of the room prevented, while the heat thus conserved will materially reduce the cost of operating the stove.

With the above and other objects in view, the invention further includes the following novel features and details of construction, to be hereinafter more fully described, illustrated in the accompanying drawings and pointed out in the appended claims.

In the drawings:

Figure 1 is a perspective view of a stove embodying the present invention.

Figure 2 is a vertical sectional view on the line 2—2 of Figure 1.

Figure 3 is a horizontal section on the line 3—3 of Figure 1.

Figure 4 is an enlarged fragmentary sectional view on the line 4—4 of Figure 6.

Figure 5 is a detail perspective view of one of the flue closures.

Figure 6 is a top plan view of the stove.

Referring to the drawings in detail, wherein like characters of reference denote corresponding parts, the reference character 10 indicates an outer casing which is preferably of cylindrical form. This casing is divided by partitions 11 and 12 into a lower fire or burner chamber 13, an upper heat chamber 14 and an intermediate chamber, the latter providing an oven 15.

The fire or burner chamber 13 has the lower edge of its side walls bent outwardly to provide a base flange 16 and is provided with an opening 17, by means of which access may be had to the interior for the purpose of controlling a burner 18, which may be of the usual or any preferred construction.

The walls of the heat chamber 14 and the oven 15 are insulated for the purpose of retaining the heat of the burner 18 and for this purpose the lower partition 11 is formed of a lower plate 19 which is provided with a peripherial flange 20, the said flange being riveted or otherwise secured to the outer casing 10 as indicated at 21. The plate 19 thus forms the top wall of the burner chamber 13. Supported upon the top of the plate 19 is a layer of insulating material 22, which is preferably formed of "85% magnesia" and overlying this insulating material 22 is a plate 23, the plates 19, 23 and the insulating material 22 thus forming the partition 11. The partition 11 is provided with an opening 24 which forms a passage for the heat from the burner 18 into the oven 15, the walls of this opening being formed by bending upwardly a flange from the plate 19 and downwardly a flange from the plate 23 and thus protecting the lining 22.

Mounted upon the upper surface of the partition 11 within the oven 15 is an inner casing 25 which is spaced from the outer casing and the space thus provided is filled with an insulating lining 26 which is preferably of the same character as the lining 22, the said lining 26 also resting upon the upper surface of the partition 11.

The lining 26 and the inner casing 25 terminate short of the top of the outer casing 10 and provide a shoulder for the partition 12. This last named partition is formed with a lower plate 27 which forms the upper wall of the oven 15, a layer of insulating material 28 and an upper plate 29. The partition 12 is provided with an opening 30 which is formed similarly to the opening 24 and permits of the passage of heat from the oven 15 into the heat chamber 14. The side walls of the heat chamber 14 are insulated by a lining 31 which is located between the outer casing 10 and the inner casing 32, the said lining and inner casing resting upon the upper surface of the plate 29.

The top of the stove is provided with a cover which is formed of an outer plate 34. This plate is provided with an overhanging flange 35 which is riveted or otherwise secured to the flange 36 which extends from the outer casing 10. The cover 34 is provided with an insulating lining 37 which is held in position between the said cover and the plate 35, the latter being suitably secured to the plate 34 and resting upon the upper edges of the lining 31 and inner casing 32. Thus, the stove may be readily assembled by riveting the lower plate 19 of the lower partition 11 and the casing 10 and inserting the interior parts of the stove, so that after the top 34 is riveted in position the said interior parts will be held against movement without auxiliary fastening devices.

The top of the stove is provided with openings 38 which are preferably formed similarly to the openings 24 and 30 and are adapted to be closed by plates 39 after the manner of the usual stove holes and plates.

The oven 15 is provided with an opening 40 which may be closed by a hinged door 41. This door is formed of an outer plate 42 which is of larger area than the opening 40 and carries an insulating lining 43 which is secured by means of a flanged container 44. An asbestos packing 45 is preferably secured around the flange provided by the overlapping part of the plate 42 so that when the door is closed escape of the heat from the oven is prevented.

The oven 15 preferably contains a grate 46 which may be positioned upon grate supports 47 and 48.

It will be apparent that the stove may be used for cooking in the usual manner and when so used, overheating of the room will be prevented due to the insulated walls of the heat chamber and the oven and thus a minimum amount of heat will be required for cooking. If desired, the food may be partially cooked and the source of heat cut off, whereupon, the passages 24 and 30 may be covered by a closure 49 and the operation of cooking continued after the manner of the ordinary fireless cooker. When it is desired to use the stove as a heater, the oven door may be opened and the heat thus permitted to escape from the side of the stove.

The invention is susceptible of various changes in its form, proportions and minor details of construction and the right is herein reserved to make such changes as properly fall within the scope of the appended claims.

Having described the invention what is claimed is:

1. A stove comprising an outer casing, a chamber provided in the bottom of the casing and adapted to contain a source of heat, a heat chamber located at the top of the casing, an intermediate chamber located between the bottom chamber and heat chamber and providing an oven, an insulated bottom for said oven, an inner casing of relatively smaller diameter arranged within the oven and spaced from the outer casing, an insulating lining between the inner and outer casings, said lining and casing terminating short of the top of the outer casing and forming a shoulder for supporting the top of the oven, an insulating lining for the oven top, and insulated walls for the top and sides of the heat chamber.

2. A stove comprising an outer casing divided horizontally by spaced insulated partitions to form a lower chamber adapted to contain a source of heat, a top heat chamber and an intermediate chamber defining an oven, an inner casing located within the oven and spaced from the outer casing, an insulated lining between the inner and outer casings, said inner casing and lining having their lower ends resting upon the lowermost partition and providing a shoulder at their upper ends for the upper partition, an insulating cover having openings therein and secured to the top of the outer casing, an inner casing located within the heat chamber and spaced from the outer casing, an insulating lining therefor, said inner casing and lining having one end abutting the cover and the opposite end abutting the upper partition and heat passages in said partition.

In testimony whereof I affix my signature.

ARTHUR B. CLARK.